United States Patent Office 3,280,536
Patented Oct. 25, 1966

3,280,536
METHOD FOR PROVIDING AN OXYGEN-ENRICHED ENVIRONMENT
Norton H. Berlin, Matawan, N.J., assignor to Esso Research and Engineering Company, a corporation of Delaware
Filed July 30, 1963, Ser. No. 298,647
8 Claims. (Cl. 55—58)

This invention relates to a process for controlling the environment within enclosed areas. In particular, the invention relates to the control of the gaseous environment within enclosed areas which are suitable for habitation particularly by human being, but also animals. The invention also relates to the control of environment within enclosed areas which are used to store food, flowers, and other perishable items. The invention is most particularly suited for the use of controlling the amount of oxygen in an enclosed area such as a room, tent, building, etc., which enclosed area is suitable for human habitation.

A preferred embodiment of the invention is a process which makes it possible to obtain a controlled condition, oxygen-enriched atmosphere which is especially suitable for those who need medical treatment. Customarily, persons suffering from such pulmonary disorders as emphysema, congestive heart failure, and the like, require up to 50% oxygen in the gas they breathe, usually in the range of about 30–40% oxygen. This compares with an oxygen content of approximately 21% in air. The patient who requires the increased oxygen content in his air hitherto had to be either confined in an oxygen tent or had to use a portable oxygen breathing device both of which are connected to oxygen tanks.

Although pure bottled oxygen has been used to enrich a room directly, e.g. at Columbia-Presbyterian Medical Center, it has not been very satisfactory. It is very expensive, require extensive manipulation, and presents an extreme fire and explosion danger if flames should flare back onto the bottle or cylinder. Moreover, the bottles or cylinders must be constantly replaced. The process and apparatus of the invention is far superior in all the respects mentioned as well as in many others.

The process of the invention besides human utility has other uses. For instance, the activity of domestic animals can be regulated for maximum productivity by using adsorption techniques to suitably adjust the oxygen-nitrogen ratio in a barn or other structure for animal inhabitation.

A preferred version of the invention is described briefly as follows. A heatless adsorption unit, the principle of which is described in U.S. Patent 2,944,627, which can be either located in a room or outside of the room, is arranged so that a concentrated oxygen stream as primary effluent is discharged within the room through one end of the unit and the undesired $N_2$ gas is discharged outside of the room. In the especially preferred embodiment of the invention an adsorbent is selected for the heatless adsorber unit which adsorbs $N_2$ and permits $O_2$ to pass through. U.S. Patent 2,944,627 is incorporated herein in its entirety by reference although as much of it as is necessary to understand the instant invention will be repeated. The adsorbent in the unit is periodically depressured to a low pressure and purged with a portion of product. The depressuring removes most of the $N_2$ from the adsorbent. The remainder is removed by the action of the portion of product used for purging. The purge gas and desorbed adsorbate removed from the adsorbent is referred to as secondary effluent. This is released from the unit to the outside of the room.

As an alternative, adsorbents selective to oxygen can be used. In such case primary effluent exits from the unit to outside the room and secondary effluent exits from the unit to within the room.

It is preferred that the apparatus which is used to supply oxygen to the room is similar in principle to that described in U.S. 2,944,627 (C. W. Skarstrom). However, an apparatus using a storage vessel to purge the adsorbent as described in U.S. Patent 2,955,673, issued to Kennedy et al. and, of course, other self-contained adsorbent apparatus of the general type contemplated can be used.

For nitrogen adsorption suitable adsorbents include 5A and 13X, 10X, chabazite, analcite type molecular sieves, alumina, silica gel, charcoal, graphite, bentonite, and the like. Type X molecular sieves which have been partially substituted with strontium are particularly effective. The amount of $Sr^{++}$ substituted in the type X sieves is about 20 to 80%, e.g. 40%, or above. Strontium substituted sieves are particularly effective in a vacuum desorption cycle. For oxygen adsorption 4A molecular sieves and the like can be used. However, 4A sieves operate by a rate process and fast cycling is necessary.

As a first consideration is was desired to enrich the oxygen content of a room. Therefore, it was decided to design a relatively small unit to produce a room atmosphere of about 30–50% $O_2$. The jumping-off place for a reasonable design was decided to be that design which would enrich a 1000 cu. ft. room to a 30% oxygen level assuming a room leak rate of about 0.1 air change per hour. Although the 30% oxygen level was chosen as the design basis it is to be emphasized that the surprising data obtained show it is possible to use the general principles disclosed herein for application to other oxygen levels besides the 30% one.

An actual prototype unit was constructed which had two adsorbent beds 39 inches high by 5.3 inches in diameter each of which beds contained 22 lbs. of 5A sieve per bed. The unit contained a Nash compressor which operated on a 110 volt source, had a 2 H.P. motor which consumed 18 amperes at top performance of 30 p.s.i.g. operation. The Nash compressor had a water consumption of between 20 to 40 gallons per hour of water.

When using this unit to enrich the oxygen content of a room, several remarkable things were discovered. One of these was that, contrary to what would be expected, the best way of enriching a room was to use feed air from outside the room while dumping desorption air outside the room. This was unexpected since the logical expectation would be that using the enriched air within the room while dumping the desorbed air outside the room would be the best way of operating the unit to enrich a room.

It was further found that at constant feed rates but at low product rates the lower the product rate the higher the percentage of oxygen in the product and, conversely, the higher the product rate the lower the oxygen percent of the product.

It was further found that the total quantity of oxygen coming off in the product was not the deciding factor. For instance, at a product rate of 60 s.c.f.h. a oxygen purity of 50% could be obtained while at a product rate of 150 s.c.f.h. an oxygen purity of 32% could be obtained. If the total volume of oxygen is calculated at the 150 s.c.f.h. rate it is found to be 48; if the total volume of oxygen is calculated for the 60 s.c.f.h. rate it is found to be 30. Yet it was discovered that a room could be brought more quickly to a target oxygen content by using the low product rate with high oxygen purity even though there was a greater quantity of oxygen per unit of time.

Furthermore, it was found that, once the room had been brought up to a target oxygen level, the room could be kept more efficiently at this level by a high product rate having an oxygen purity in the product of approximately that of the room.

The above considerations are most important since operating under these product rates allows a substantial difference in power consumption. Since a unit of the type described and other analagous units would presumably be running at least several hours a day power requirements and savings in power requirements are quite vital.

In order to define the size of a medical oxygen unit with respect to room characteristics, such as leak rate and room size, mathematical models were developed. It was found that these models could be used to predict the best method of operating the unit for both transient and steady conditions. This is important since some of the uses for the medical oxygen unit are likely to be of an intermittent nature where the patient requires only several hours a day of enriched oxygen. A desirable medical oxygen unit should be able to bring a room up to the desired oxygen concentration in a reasonable time as well as be able to maintain the enriched oxygen level. Therefore, it is important to know both the best method of operating the unit for enriching room oxygen and for steady state operation to maintain enriched oxygen. Mathematical models were first set up for the transient period. Unsteady state differential equations were developed for predicting the change in room oxygen concentration with time for the four cases following.

Case I: Once-through operation (no external air leakage into room).
Case II: Total recycle with unit dump makeup supplied by external air leakage into room.
Case III: Partial recycle with unit dump makeup supplied by external air feed (no air leakage into room).
Case IV: Partial recycle with unit dump makeup supplied by external air feed assuming air leakage into room equals enriched air leakage out of room.

The equations of these models were solved using the particular prototype design with respect to a 1000 cu. ft. room. The results are shown below in Table I, using 30% as the target.

TABLE I

| Case No.[1] | Description | Air Leakage Into Room, s.c.f.h. | Time to 30% $O_2$, Hrs. |
|---|---|---|---|
| I | Once-through | 0 | 10 |
| II | Total Recycle | 175 | 20 |
| III | Partial Recycle | 0 | 7 |
| IV | Partial Recycle [2] | 50 | 11 |

[1] Design conditions: 1000 cu. ft. room, unit feed to room 100 s.c.f.h. at 35% $O_2$.
[2] Assumes air leakage into room equals enriched air leakage out.

Theoretically, the partial recycle operation of the unit with external dump makeup (Case III) appears to be the quickest way to increase the room $O_2$ content from 21 to 30%, assuming no air leakage into the room. However, the once-through case is probably more practical since it would be difficult to maintain a leak-tight room with the recycle external dump makeup system. This is because the room would always be under a slightly subatmospheric pressure. A realistic recycle operation would fall between Cases II and III as illustrated by Case IV where a small amount of air leakage into the room has a marked effect on increasing room enrichment time. On the other hand, the once-through operation would tend to build up room pressure and reduce air leakage into the room. These results certainly point out the need for defining the performance of the unit in an actual room. The choice of "mode of operation," recycle vs. once-through, can only be made once the dynamic air leakage characteristics of a typical room are defined.

The derivations of the differential equations comprising the mathematical models for the four cases are as follows.

*Prediction of room unsteady state characteristics for medical $O_2$ projects*

Case I: Once-through.
 Definition of terms:
  $V$ = Volume of room—cu. ft.
  $P$ = Preprototype unit product rate—s.c.f.h.
  $t$ = Time, hours
  $x(t)$ = Mole fraction $O_2$ in room at time $t$
  $y$ = Ave. mole fraction $O_2$ in product from unit

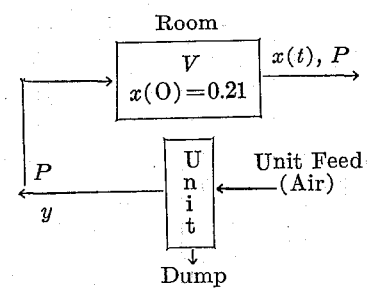

Basis for differential equations:
  Perfect mixing.
  Unit product flow to room = flow leaving room (no external uncontrolled air leaks).
 Basic differential equation for system:

$$(dx/dt)+(P/V)x(t)=(P/V)y$$

General solution to above equation:

$$x(t)=C_1 e^{-\left(\frac{P}{V}\right)t}+y$$

where $C_1$ is a constant.
 Boundary conditions:
  $x(0)=0.21$ at time 0
  $C_1=0.21-y$
 Specific equation:

$$x(t)=\underbrace{(0.21-y)e^{-\left(\frac{P}{V}\right)t}}_{\text{Transient Solution}}+\underbrace{y}_{\text{Steady State Solution}}$$

Case II: Recycle with unit dump loss supplied by air leakage into room.
 Definition of terms:
  $V$ = Volume of room—cu. ft.
  $P$ = Preprototype unit product rate—s.c.f.h.
  $D$ = Unit dump rate or losses—s.c.f.h.
  $L$ = Room leak rate—s.c.f.h.
  $F$ = Unit feed rate—s.c.f.h.
  $t$ = Time—hours
  $x(t)$ = Mole fraction $O_2$ in room at time $t$
  $y(t)$ = Ave. mole fraction $O_2$ in product from unit

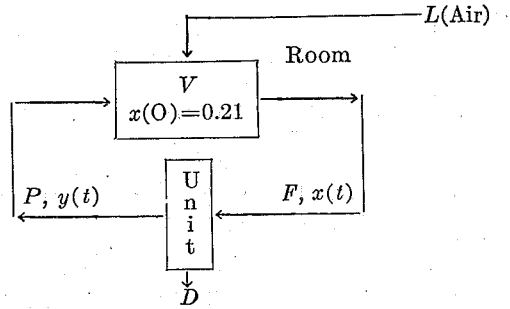

Basis for differential equations:
  Perfect mixing
  Air leakage into room equals unit dump loss
  Unit capabilities estimated from data at 30 p.s.i.g.
   $y(t)=0.15+x(t)$
   $F/P=2.6$
   $L=D=1.6P$ Basic differential equation for system:
$dx/dt + (L/V)x(t) = 0.21(L/V) + 0.15(P/V)$
General solution to above equation:

$$x(t) = C_1 e^{-\left(\frac{L}{V}\right)t} + 0.21 + 0.15\left(\frac{P}{L}\right)$$

Boundary conditions:
$x(0) = 0.21$ at time 0
$C_1 = (P/L)0.15$
Specific equation:

$$x(t) = \underbrace{-\left(\frac{P}{L}\right)0.15 e^{-\left(\frac{L}{V}\right)t}}_{\text{Transient solution}} + \underbrace{0.21 + \left(\frac{P}{L}\right)0.15}_{\text{Steady state solution}}$$

Steady state solution at infinite $t$
$x(\infty) = 0.21 + (1/1.6)0.15 = 0.304$

This result illustrates that 30.4% $O_2$ is the theoretical limit for this system based on the estimated unit capabilities.

Case III: Recycle with unit dump loss supplied by external air feed to unit.
Definition of terms:
$V$ = Volume of room—cu. ft.
$P$ = Preprototype unit product rate—s.c.f.h.
$D$ = Unit dump rate or losses—s.c.f.h.
$E$ = Unit external air feed rate—s.c.f.h.
$F$ = Unit combined feed rate $(P+E)$—s.c.f.h.
$t$ = Time—hours
$x(t)$ = Mole fraction $O_2$ in room at time $t$
$y(t)$ = Ave. mole fraction $O_2$ in product from unit
$f(t)$ = Mole fraction $O_2$ in combined feed to unit

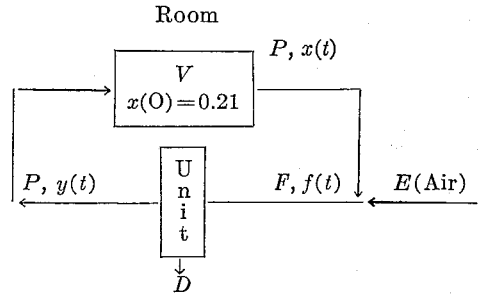

Room

Basis for differential equations:
Perfect mixing
Leaktight room so that unit product flow to room equal flow leaving room
Unit capabilities estimated from data at 30 p.s.i.g.
$y(t) = 0.15 + f(t)$
$F/P = 2.6$
$E = D = 1.6P$ Basic differential equation for system:
$(dx/dt) + (PE/FV)x(t) = 0.21(PE/FV) + 0.15(P/V)$
General solution to above equation:

$$x(t) = C_1 e^{-\left(\frac{PE}{FV}\right)t} + 0.21 + 0.15\left(\frac{F}{E}\right)$$

Boundary conditions:
$x(O) = 0.21$ at time 0
$C_1 = -0.15(F/E)$
Specific equation:

$$x(t) = \underbrace{-0.15\left(\frac{F}{E}\right)e^{-\left(\frac{PE}{FV}\right)t}}_{\text{Transient solution}} + \underbrace{\left[0.21 + 0.15\left(\frac{F}{E}\right)\right]}_{\text{Steady state solution}}$$

Steady state solution at infinite $t$:
$x(\infty) = 0.21 + 0.15(1.625) = 0.454$

This result illustrates that 45.4% $O_2$ is the theoretical limit for this system. Comparison of Cases II and III illustrates the importance of reducing room leaks in a recycle system.

Case IV: Recycle with unit losses supplied by external air feed to unit incorporating room leakage.
Definition of terms:
$V$ = Volume of room—cu. ft.
$P$ = Preprototype unit product—s.c.f.h.
$M$ = External air leakage into room—s.c.f.h.
$D$ = Room composition gas leakage out of room—s.c.f.h.
$L$ = Recycle from room back to unit—s.c.f.h.
$E$ = External air feed to unit—s.c.f.h.
$F$ = Combined feed rate to unit—s.c.f.h.
$x(t)$ = Mole fraction $O_2$ in room at time $t$
$y(t)$ = Ave. mole fraction $O_2$ in product from unit
$f(t)$ = Mole fraction $O_2$ in combined feed to unit

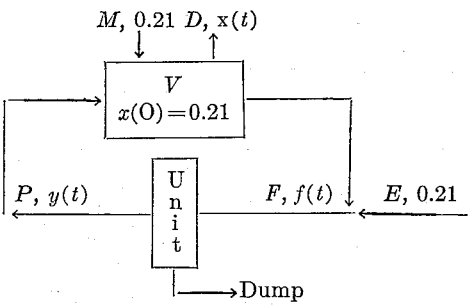

Basis for differential equations:
Perfect mixing
Unit capabilities for 30 p.s.i.g. operations @ $P = 100$ s.c.f.h.
$y(t) = 0.15 + f(t)$
Basic differential equation for system:

$$\frac{dx}{dt} \times \left[\left(\frac{D+L}{V}\right) - \left(\frac{PL}{VF}\right)\right] \times (t) = 0.15\left(\frac{P}{V}\right) + 0.21\left(\frac{PE}{VF}\right) + 0.21\left(\frac{M}{V}\right)$$

General solution to above equation:

$$x(t) = C_1 e^{-bt} + \left(\frac{a}{b}\right)$$

where $$b = \left[\left(\frac{P+L}{V}\right) - \left(\frac{PL}{VF}\right)\right]$$

$$a = 0.15\left(\frac{P}{V}\right) + 0.21\left(\frac{PE}{VF}\right) + 0.21\left(\frac{M}{V}\right)$$

Boundary conditions:
$x(O) = 0.21$ at time 0
$C_1 = 0.21 - (a/b)$

Specific equation:

$$x(t) = \underbrace{\left[0.21 - \left(\frac{a}{b}\right)\right]e^{-bt}}_{\text{Transient Solution}} + \underbrace{\left(\frac{a}{b}\right)}_{\substack{\text{Steady} \\ \text{State} \\ \text{Solution}}}$$

The invention can be more fully understood from the following description read with reference to the accompanying drawings in which.

Figure 1:
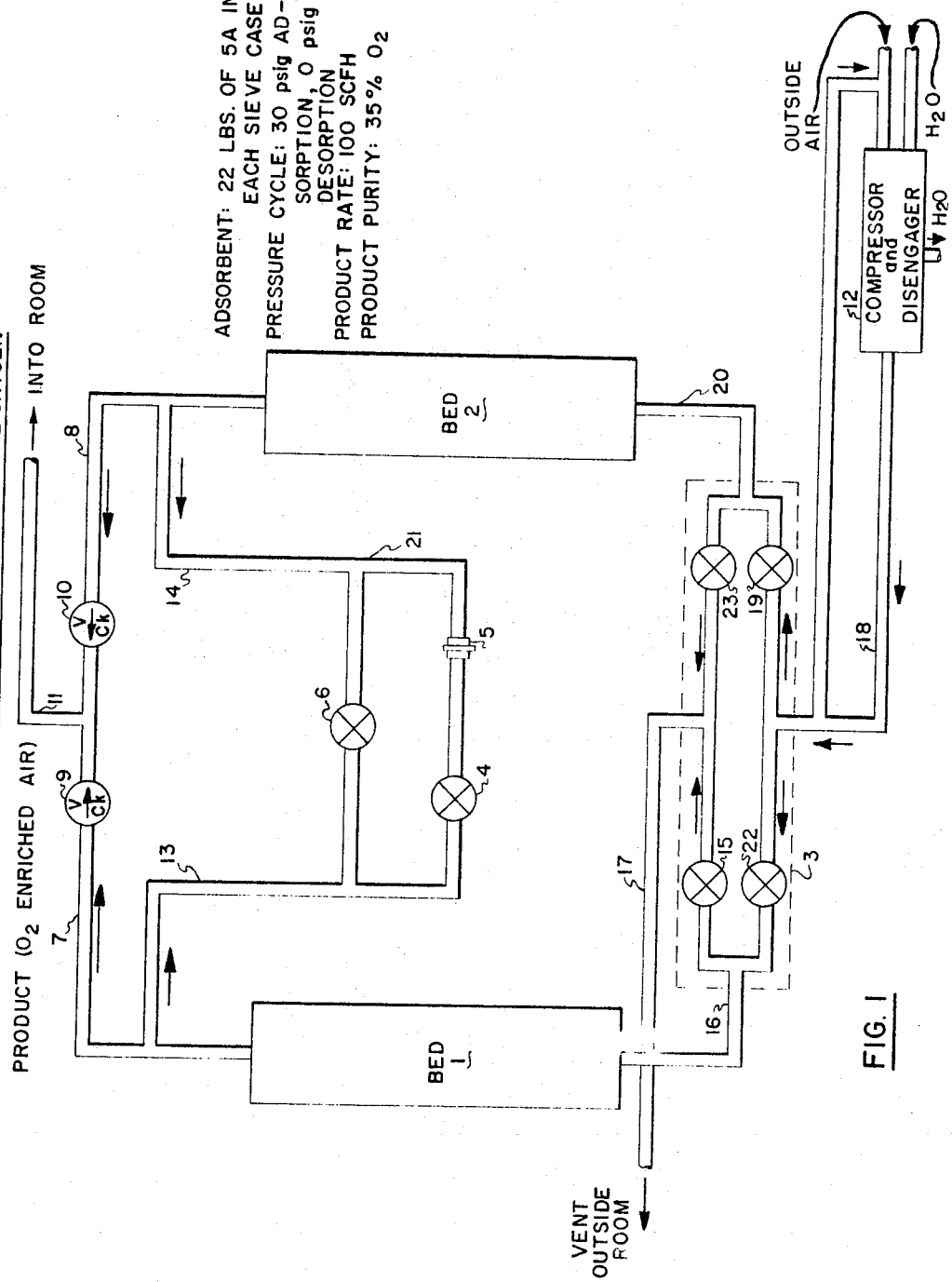
FIGURE 1 is a schematic illustration of the medical oxygen unit used in the examples and for acquiring the data presented in this application.
Figure 2:
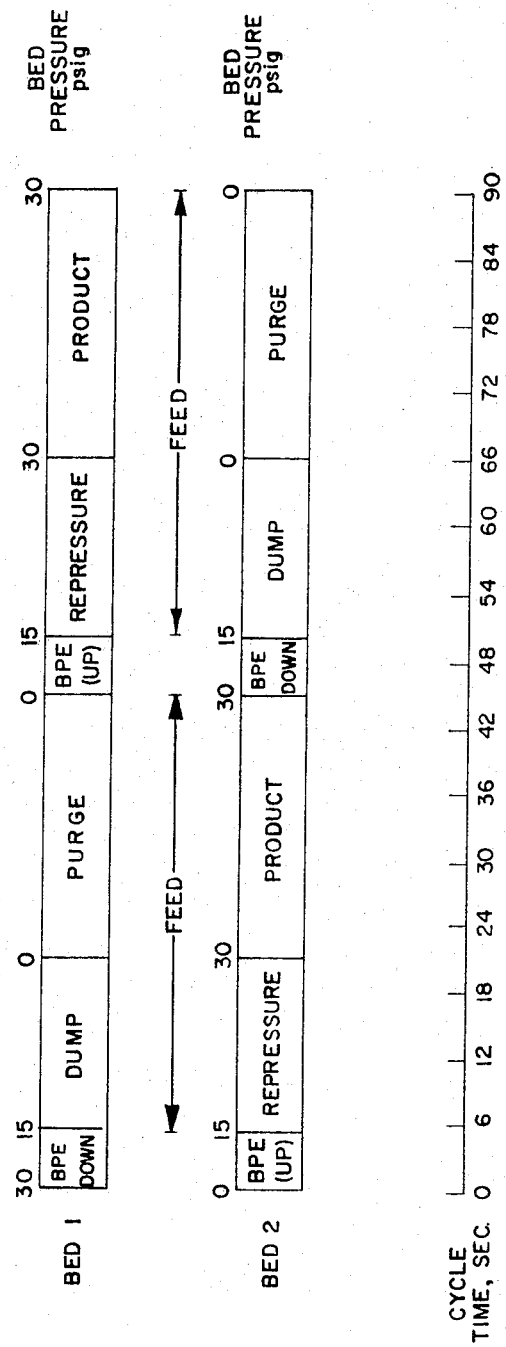
FIGURE 2 is an illustration of a cycle schedule of a preferred 90-second cycle which is used in the medical oxygen unit in FIGURE 1.

With reference to FIGURE 1 and FIGURE 2, the operation of the unit is explained. Bed 1 and bed 2 are connected at the feed end by a four-way, five-ported "Versa" valve 3 and at the top by purge valve 4 and purge orifice 5 as well as by bed pressure equalization (B.P.E.) valve 6. Product is taken from beds 1 and 2 through lines 7 and 8 through check valves 9 and 10 and out through product line 11. Compressor and disengager 12 is a Nash compressor as described above.

Starting at the far left of the cycle schedule, bed 1 is on B.P.E. and bed 2 is on B.P.E. which means that B.P.E. valve 6 is open permitting free communication between bed 1 and bed 2 through lines 13 and 14. The pressure is bed 1 is being reduced from 30 p.s.i.g. to 15 p.s.i.g. and the pressure within bed 2 is being raised from 0 p.s.i.g. to 15 p.s.i.g. At the next stage in the cycle, port 15 opens to allow the pressure in bed 1 to be reduced from 15 p.s.i.g. to 0 p.s.i.g. with the concomitant discharge of adsorbed materials through line 16 port 15 and out through vent line 17. At the same time bed 2 is being repressured with air from compressor 12 through line 18 into Versa valve 3 through port 19 and through line 20 into bed 2. So, as bed 1 is reduced from 15 p.s.i.g. to 0 p.s.i.g., bed 2 is being repressured from 15 p.s.i.g. to 30 p.s.i.g. During the dump and repressure cycles B.P.E. valve 6, purge valve 4, and purge orifice 5 are all closed. In the next phase of the cycle purge valve 4 is opened to allow a portion of product from bed 2 to flow through line 14, line 21, line 13 and into bed 1, where it passes through bed 1 picking up adsorbed constituents, passes through line 16, port 15 and out through vent 17. At the same time, product from bed 2 is flowing in line 8, valve 10, and into the room through line 11.

At the end of this phase of the cycle B.P.E. valve 6 is opened and the flow of compressed air through line 18 is halted. Bed 1 goes from a pressure of 0 p.s.i.g. to 15 p.s.i.g. and bed 2 goes from a pressure of 30 p.s.i.g. to 15 p.s.i.g. The flow of compressed air is recommenced through line 18 into Versa valve 3 through port 22, line 16 and into bed 1, B.P.E. valve 6 and purge valve 4 being closed. This causes the pressure in bed 1 to build up from 15 p.s.i.g. to 30 p.s.i.g. At the same time bed 2 is vented to the outside through port 23 which allows adsorbed constituents to exit through line 20 into Versa valve 3 through port 23 and out through vent line 17.

When the pressure in bed 1 reaches 30 p.s.i.g. product comes out off bed 1 through line 7 valve 9 and into the room through line 11. At the same time purge valve 4 is opened allowing a portion of product to flow through line 13 purge valve 4 line 21 and line 14 into bed 2 which carries the balance of adsorbed constituents through line 20 into port 23 and out of the room through vent line 17. At the conclusion of this phase of the cycle bed 1 is at a pressure of 30 p.s.i.g. and bed 2 is at a pressure of 0 p.s.i.g.

The invention is further illustrated by the following examples. The apparatus used in these examples was that described above and under the conditions described above unless otherwise indicated.

*Example 1*

In this example the unit was operated with a 90-second cycle (as described above). The pressure was varied from 23–29 p.s.i.g. for a corresponding air feed rate variation of 360 to 275 s.c.f.h. The relationship between product rate and composition is shown in FIGURE 3.

Figure 3:
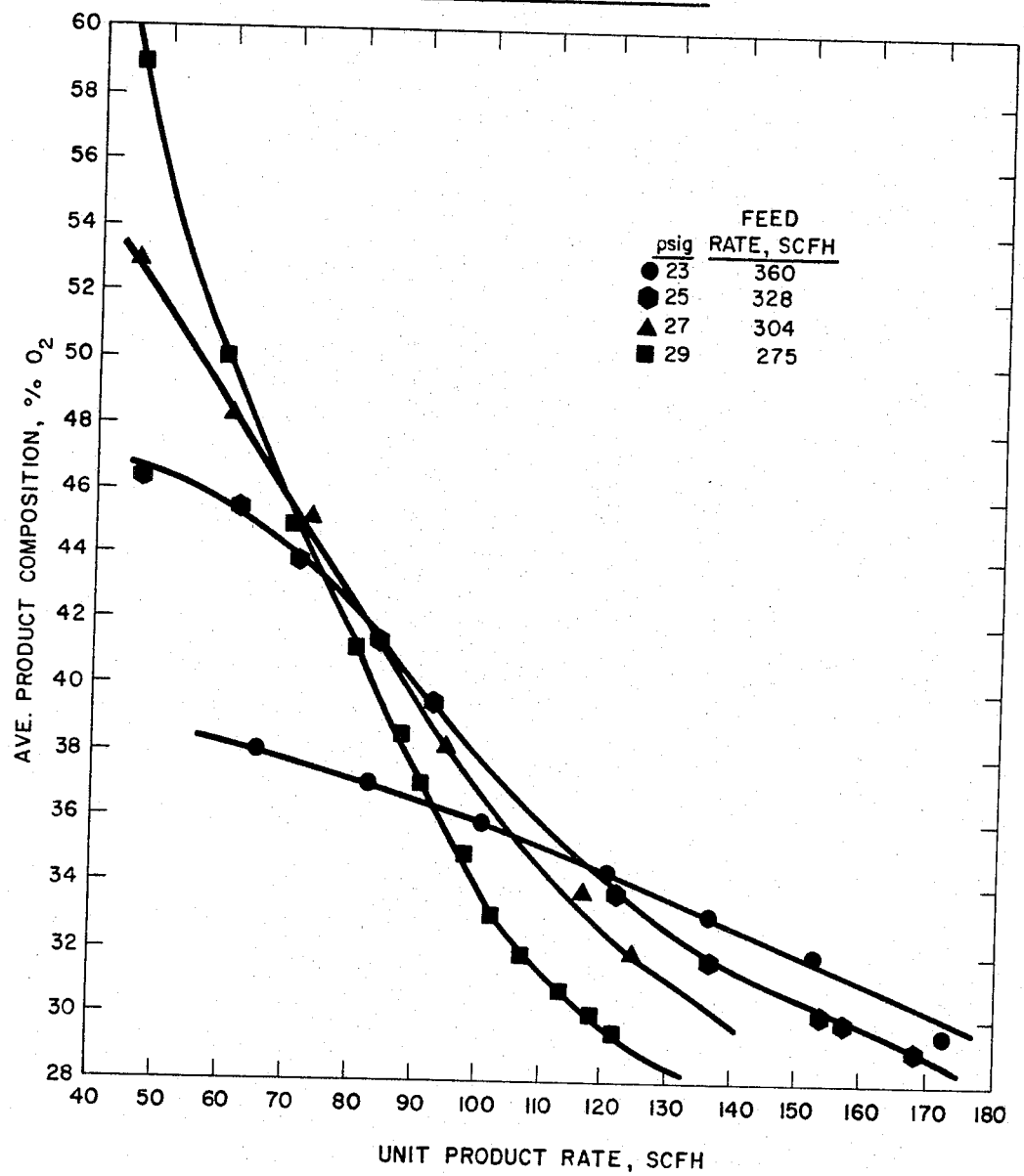
FIGURE 3 is a plot showing the relationship between product rate and product composition.

It can be seen from FIGURE 3 that by dropping pressure from 29 p.s.i.g. to 23 p.s.i.g., product rates can be boosted about 50% over the 100 s.c.f.h. design without dropping product O$_2$ purity much from design (32 vs. 35% O$_2$). Moreover, if it is desired to increase product O$_2$ it can best accomplished by increasing pressure and operating at lower product rates.

*Example 2*

In order to determine the effect of varying the length of the cycle a 60-second cycle was tried. The unit was operated at 25 p.s.i.g. with a product rate of 100 s.c.f.h. The B.P.E. and repressure steps were unchanged for the two cycle lengths. Only feed and product times were functions of the cycle length. The results are as follows in Table II.

TABLE II

|  | Cycle Length | |
| --- | --- | --- |
|  | 60 Sec. | 90 Sec. |
| Product Rate, s.c.f.h. | 100 | 100 |
| Percent O$_2$ | 38¼ | 38 |

This experiment indicates that changes in the time of the cycle are not significant and that cycle times can be selected as a matter of convenience. Generally, cycle times of from 10 to 300 seconds, preferably 50 to 200 seconds and, most preferably, 70 to 120 seconds, will be used in the process of the invention.

*Example 3*

Figure 4:
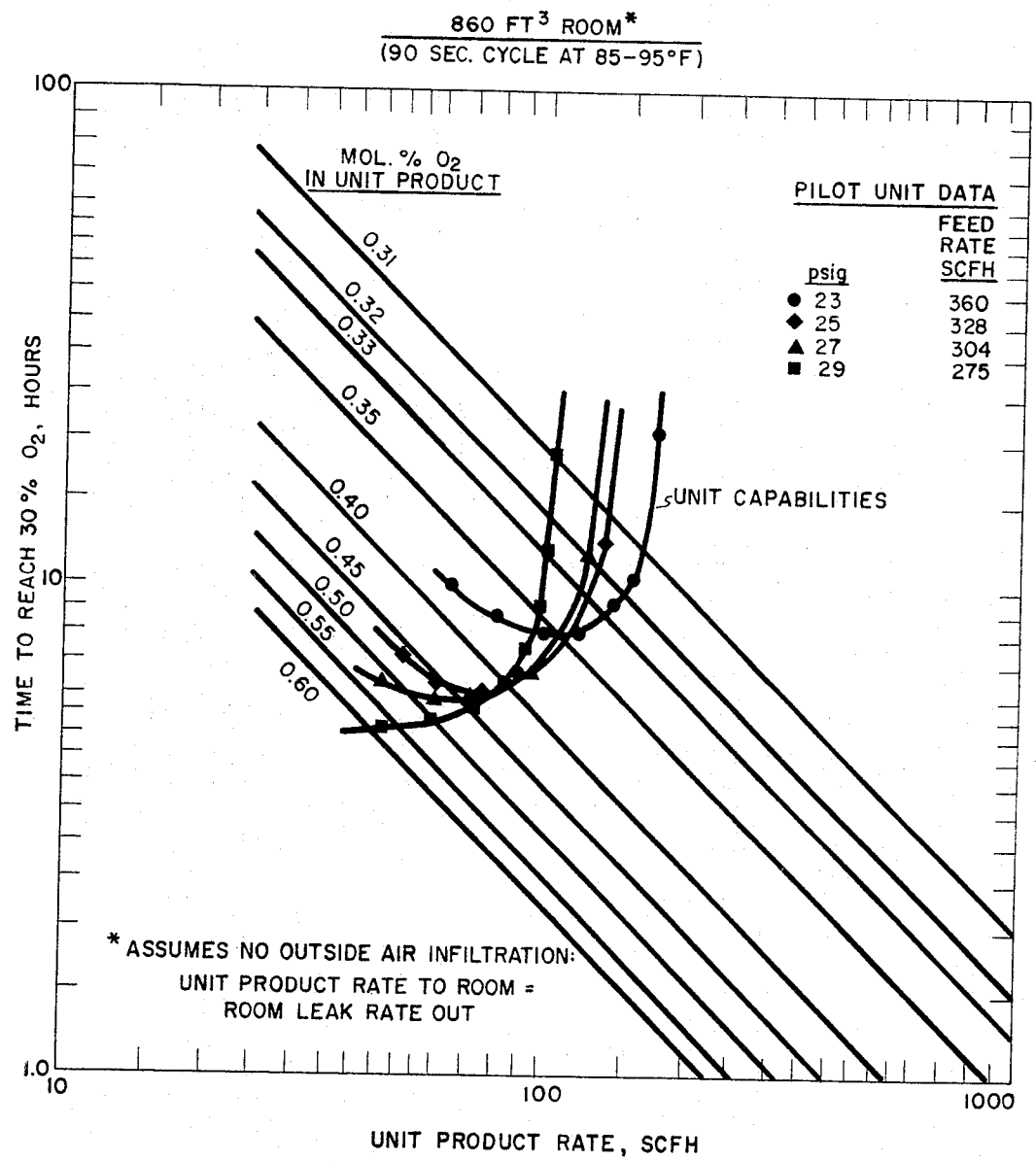
FIGURE 4 is a plot showing predicted transient room characteristics for the once-through situation.

A prediction of unit performance in a 860 cu. ft room was made by determining the oxygen unit capabilities on the once-through model. This plot is shown in FIGURE 4.

The results show that a minimum point develops for each pressure (feed rate). As pressure is increased, the minimum time to reach 30% O$_2$ in the 860 cu. ft. room decreases. The optimum conditions for transient operation are 29 p.s.i.g. (275 s.c.f.h. feed rate) and 45–60 s.c.f.h. product rate This results in 60 to 50% O$_2$ and a corresponding time to reach 30% O$_2$ of 5 to 5½ hours, assuming no external air leakage into the room. The locus of the preprototype unit minimum points was also incorporated into the model. External air leakage into the room was included as a more realistic case.

Figure 5:
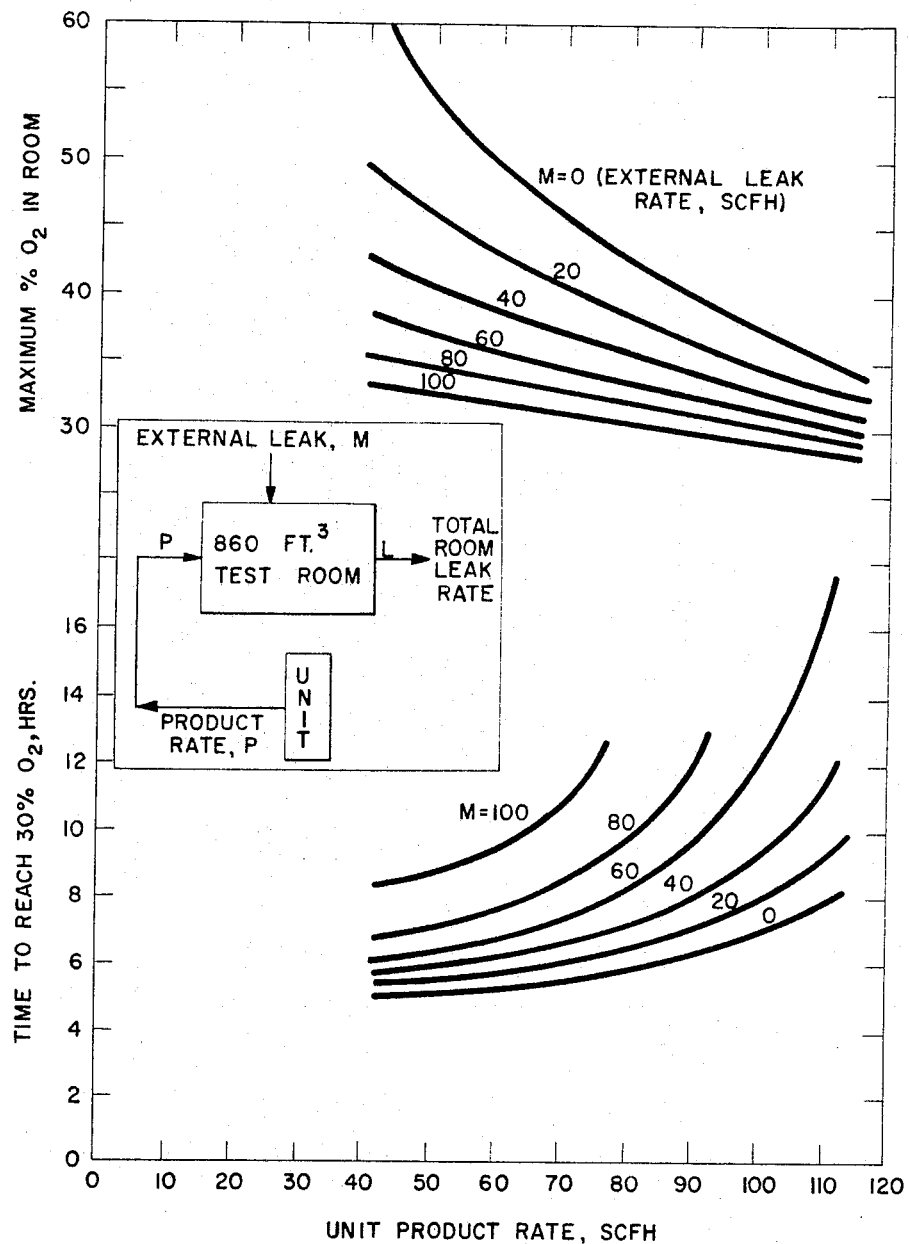
FIGURE 5 is a schematic illustration of a model for once-through operation and a 860 cu. ft. room and a chart of time to reach 30% O$_2$ vs. unit product rate.

These results point out that air leak rate can be critical especially when operating at high product rates from the unit. These effects are substantially minimized when unit operation is restricted to low rate at high purity. Still another advantage of low product rate is high steady state room O$_2$ level. For example, a steady state level of 50 to 60% O$_2$ is theoretically possible at low product rates (40 to 60 s.c.f.h.) assuming no air leaks. This is in contrast to 30 to 35% O$_2$ at higher product rates 110 to 120 s.c.f.h. Air leak rate, of course, has a marked effect on room O$_2$ level. The actual results for the 860 cu. ft. room are shown in FIGURE 5.

*Example 4*

Initial tests were made using once-through operation with the room moderately taped. That is, major wall and floor cracks and forced air heating ducts were sealed. Helium decay measurements were made with and without the unit operating. This well-established technique for leak rate measurements was used by injecting a pulse of helium into the room and measuring the helium concentration variation with time by a mass spectrometer. The leak rates determined by this technique measures only leakage of air out of the room. External air leakage into the room must be calculated by material balance.

The room leak rate out was 150 s.c.f.h. with or without the unit operating. Additional tests were made after the room was severely taped including the window, the door, wall outlets and switches, etc.; the room leak rate was reduced to 120 s.c.f.h.

Results of the unit operability tests were in excellent agreement with those predicted by the model. For example, it took nine hours to bring the room from 21 to 30% $O_2$ vs. eight and one-half hours predicted for a 150 s.c.f.h. leak rate. Reducing the leak rate out to 120 s.c.f.h. cut the time to attain 30% $O_2$ by about two and one-half hours. The maximum $O_2$ level which could be maintained was 32–35% depending on the leak rate. Results of these tests, are summarized below in Table III.

TABLE III

|  | Once-through [1] | |
| --- | --- | --- |
|  | Measured | Predicted |
| L=150 s.c.f.h.:[2] | | |
| Time to 30%, Hrs | 9 | 8½ |
| Maximum, Percent $O_2$ | 32 | 33 |
| L=120 s.c.f.h.:[2] | | |
| Time to 30%, Hrs | 6½ | 6¾ |
| Maximum, percent $O_2$ | 35 | 35 |

[1] 29 p.s.i.g., prod. rate=60 s.c.f.h. at 50% $O_2$.
[2] Total leak rate out of room.

It is believed that maintaining 35% $O_2$ is a practical upper limit for the preprototype unit in this particular room. Higher room $O_2$ concentrations could be obtained by reducing room size with the existing unit or increasing unit size for the 860 cu. ft. room. These results have demonstrated that the model is a powerful tool for predicting room enrichment time once unit capabilities and room leak rate characteristics are set.

*Example 5*

A partial recycle mode of operation was carried out in a test run. This was accomplished by connecting a recycle line from the room back to the suction side of the feed compressor. In addition, an external air makeup line was included so that combined recycle plus make-up rates satisfied the feed rate requirement. The recycle test was made with the room severely taped. The recycle rate was 90 s.c.f.h. from the room back to the unit. The unit conditions were set at 29 p.s.i.g. (275 s.c.f.h. feed rate) and a product rate of 60 s.c.f.h.

The results of this test showed that it took 13 hours to reach 30% $O_2$—nearly twice that for the once-through operation with the room taped to the same degree. The results shown below in Table IV illustrate again that the model was in excellent agreement with the measured results.

TABLE IV

|  | Once-through [1] | | Recycle [1] | |
| --- | --- | --- | --- | --- |
|  | Measured | Predicted | Measured | Predicted |
| Time to Reach 30% $O_2$, Hrs | 6 | 6¾ | 13 | 12.9 |
| Maximum Percent $O_2$ | 35 | 36 | 31 | 31 |
| External Air Leak Rate into Room, s.c.f.h | 60 | 60 | 115 | 115 |

[1] 860 cu. ft. room, taped the same for each operation.

The reason that the partial recycle operation required a longer buildup time to 30% $O_2$ in this test is basically that the leak rate of 21% $O_2$ air into the room was significantly higher for the recycle operation. This occured because withdrawal of enriched air from the room in the recycle line resulted in the room being at a slightly lower pressure than for the once-through operation. Hence, air leakage into the room through small untaped cracks, etc., increased sufficiently to overcome the advantage of feeding higher $O_2$ concentrations to the adsorption unit.

Of course, if the external leak rate into the room were the same for both cases, then the recycle operation would be more attractive. This would require reduction of the external air leak rate by 50% for the recycle operation which requires much more severe taping or sealing then has yet been demonstrated.

*Example 6*

A room test was carried out to determine the best conditions required to maintain a 30% oxygen level in a room. This was accomplished by operating the unit at low pressure (high feed rate) with a produce rate of 140 s.c.f.h. at 33% $O_2$. These conditions were imposed following a once-through transient test with the room at 35% $O_2$, 75° F. and 46% relative humidity.

Figure 6:
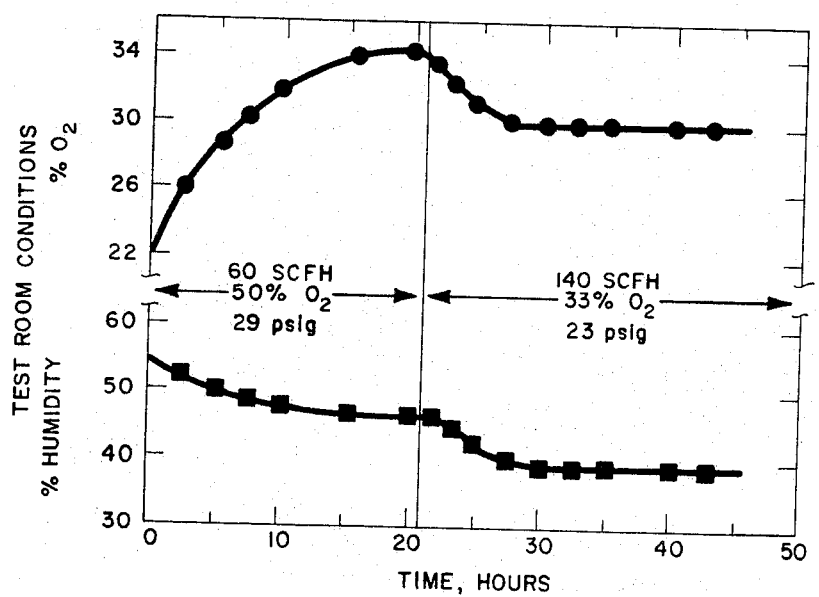
FIGURE 6 is a plot of test room conditions vs. time in hours.

The results which are shown in FIGURE 6 illustrate that the 30% $O_2$ level was maintained for the duration of this phase of the test—more than 24 hours. The test room temperature varied between 75 and 71° F., while the humidity dropped from 46% initially to 39% where it held for most of the tests. The high rate, low purity conditions had the added advantage of lower operating costs with the existing Nash compressor, since lower pressure operation reduced compressor power consumption—18 amps. at 29 p.s.i.g. vs. 15 amps. at 23 p.s.i.g.

Additional room maintenance tests were conducted to determine the effect of small room upsets and human occupancy on test room conditions. These tests were made using the high rate, low purity, once-through conditions. In these tests, room upsets were made by opening the test room door several times during a five-minute period. The result was a drop in room $O_2$ level by only ½% which recovered in half an hour. At one occasion, three persons entered the test room, stayed about five to ten minutes, and left. The result was a ½% drop in $O_2$, a rise in temperature of 2° F., and a rise in humidity of 5% (39 to 44%). The room returned to the previous levels after only an hour. Therefore, short-term room transients such as opening and closing doors, and people entering and leaving the room have only a minor effect on the $O_2$ level, temperature, and humidity.

Determination of the effects of room occupancy on atmospheric conditions was carried out. A person spending three hours in the room reported the atmosphere to feel refreshing and crisp without odor buildup. Relative humidity increased from 40% to 62% in this time and no $CO_2$ buildup was noted. In general, steady state levels of $CO_2$ and humidity can be calculated with a reasonable degree of accuracy.

Figure 7:
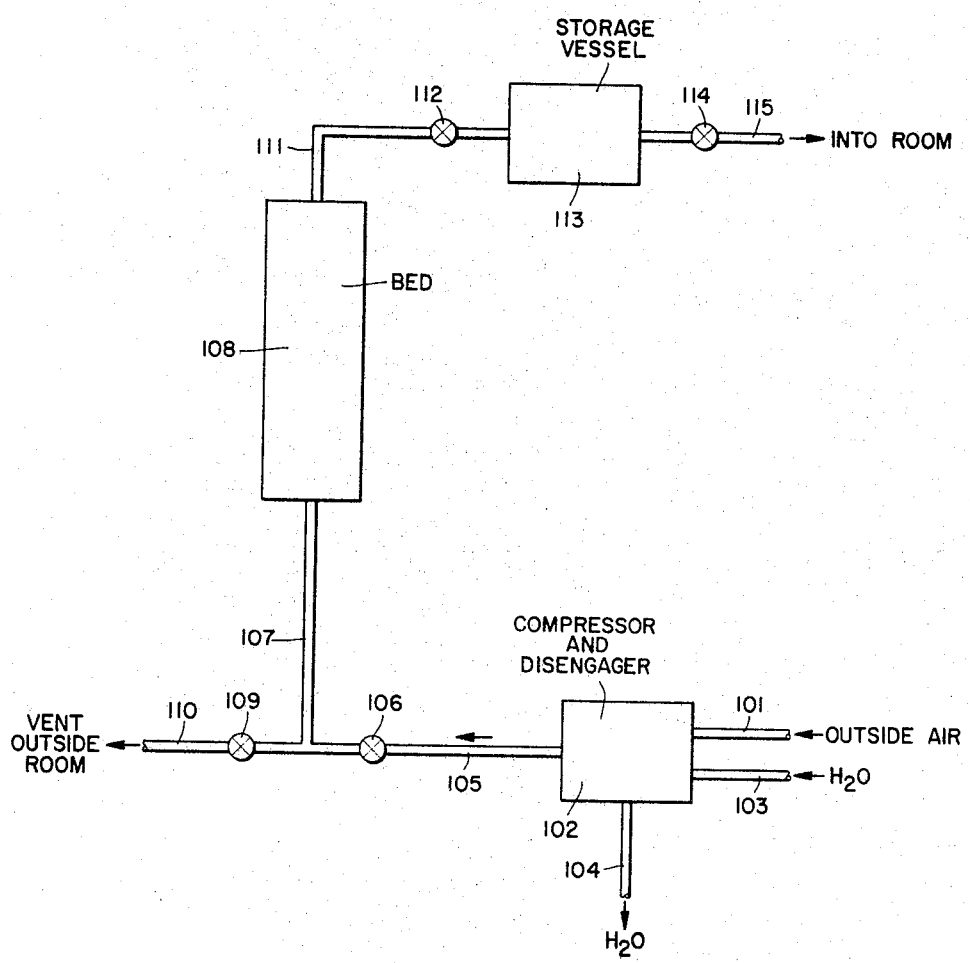
FIGURE 7 is a schematic illustration of a single bed embodiment of the medical oxygen unit.

With reference to FIGURE 7, the operation of the unit is explained as follows. Outside air enters through line 101 through compressor and disengager 102 which is a Nash Compressor, as described previously. Water for the compressor enters through line 103 and exits via line 104. The compressed air enters the system via line 105, check valve 106 and line 107. During the adsorption cycle, valve 106 is opened and valve 109 is closed allowing bed 108 to be pressurized. When the desired pressure is reached, the oxygen-enriched primary effluent is discharged into the room via 111, check valve 112, storage vessel 113, valve 114 and line 115.

At periodic intervals the air flow into bed 108 is interrupted by closing valve 106. Valve 109 is opened thereby venting the bed to the outside via line 110. Oxygen-enriched primary effluent is passed countercurrent through the bed 108 from storage vessel 113 thereby desorbing the bed. The cycle is returned back to the adsorption phase by returning the valve positions to their original condition indicated above.

Although the invention has been described with some degree of particularity, it will be understood that variations and modifications can be made therein without departing from the spirit of the invention as hereinafter claimed.

What is claimed is:

1. A method of providing an oxygen-enriched air environment to a closed region which comprises introducing a stream of air from without said closed region at a relatively high pressure into a first adsorbent bed containing adsorbent selective to nitrogen, discharging an oxygen-enriched primary effluent from said first bed, segregating a portion of said oxygen-enriched, primary effluent and conveying it into said closed region, conveying the remainder of said primary effluent at a relatively low pressure through a second adsorbent bed which has been previously used to adsorb nitrogen from the air and which has been partially purged by reducing the pressure therein to a relatively low pressure, obtaining a secondary effluent from said second adsorbent vessel and discharging said secondary effluent outside said closed region and thereafter cyclically continuing the operation and wherein adsorption conditions are regulated so as to produce a relatively low volume of product at a relatively high product purity until said closed region attains a certain desired oxygen level and thereafter regulating adsorption conditions so that the volume of product is relatively high and wherein the concentration of $O_2$ in said product is approximately the same as the concentration of $O_2$ within said enclosed area.

2. A method according to claim 1 wherein said enclosed region is suitable for human habitation.

3. A method according to claim 1 wherein said relatively high pressure is about 15 to 50 p.s.i.g. and said relatively low pressure is from 0 to 10 p.s.i.g.

4. A method according to claim 1 wherein said regulation for achieving a high volume of product comprises lowering the purge to feed ratio.

5. A method according to claim 1 wherein said air is raised to a relatively high pressure with a Nash air compressor having a water consumption of 20 to 40 gallons per hour of water, a two horsepower motor and consumes about 18 amperes at about 30 p.s.i.g. operation from 110 v.

6. A method according to claim 5 wherein said high product rate is achieved by lowering said relatively high pressure from about 30 p.s.i.g. to about 23 p.s.i.g.

7. A method according to claim 1 wherein each cycle is from 10 to 300 seconds.

8. A method of providing an oxygen-enriched environment to an enclosed region suitable for human inhabitation which comprises in combination flowing air from without said enclosed region under pressure into an adsorbent bed containing an adsorbent selective to nitrogen, discharging an oxygen-enriched primary effluent into a storage vessel and withdrawing oxygen-enriched, primary effluent from said storage vessel into said closed area, periodically interrupting adsorption and reducing the pressure on the adsorbent bed causing a portion of primary effluent to pass through the adsorbent bed counter-current to adsorption producing a secondary effluent stream which is discharged without said enclosed region thus causing the adsorbent bed to be purged and thereafter cyclically continuing the operation and wherein adsorption conditions are regulated so as to produce a relatively low volume of product at a relatively high product purity until said closed region attains a certain desired oxygen level and thereafter regulating adsorption conditions so that the volume of product is relatively high and wherein the concentration of $O_2$ in said product is approximately the same as the concentration of $O_2$ within said enclosed area.

References Cited by the Examiner

UNITED STATES PATENTS

| 2,303,331 | 12/1942 | Dauphinee | 55—20 |
| 2,944,627 | 7/1960 | Skarstrom | 55—62 |
| 3,080,693 | 3/1963 | Glass et al. | 55—33 X |
| 3,085,379 | 4/1963 | Kiyonaga et al | 55—58 X |

REUBEN FRIEDMAN, *Primary Examiner.*